Feb. 11, 1958
W. H. WILCOX
2,823,295
METHOD OF, AND APPARATUS FOR, ATTACHING
INSERTS TO CIRCULAR SAW TEETH
Filed Jan. 11, 1957
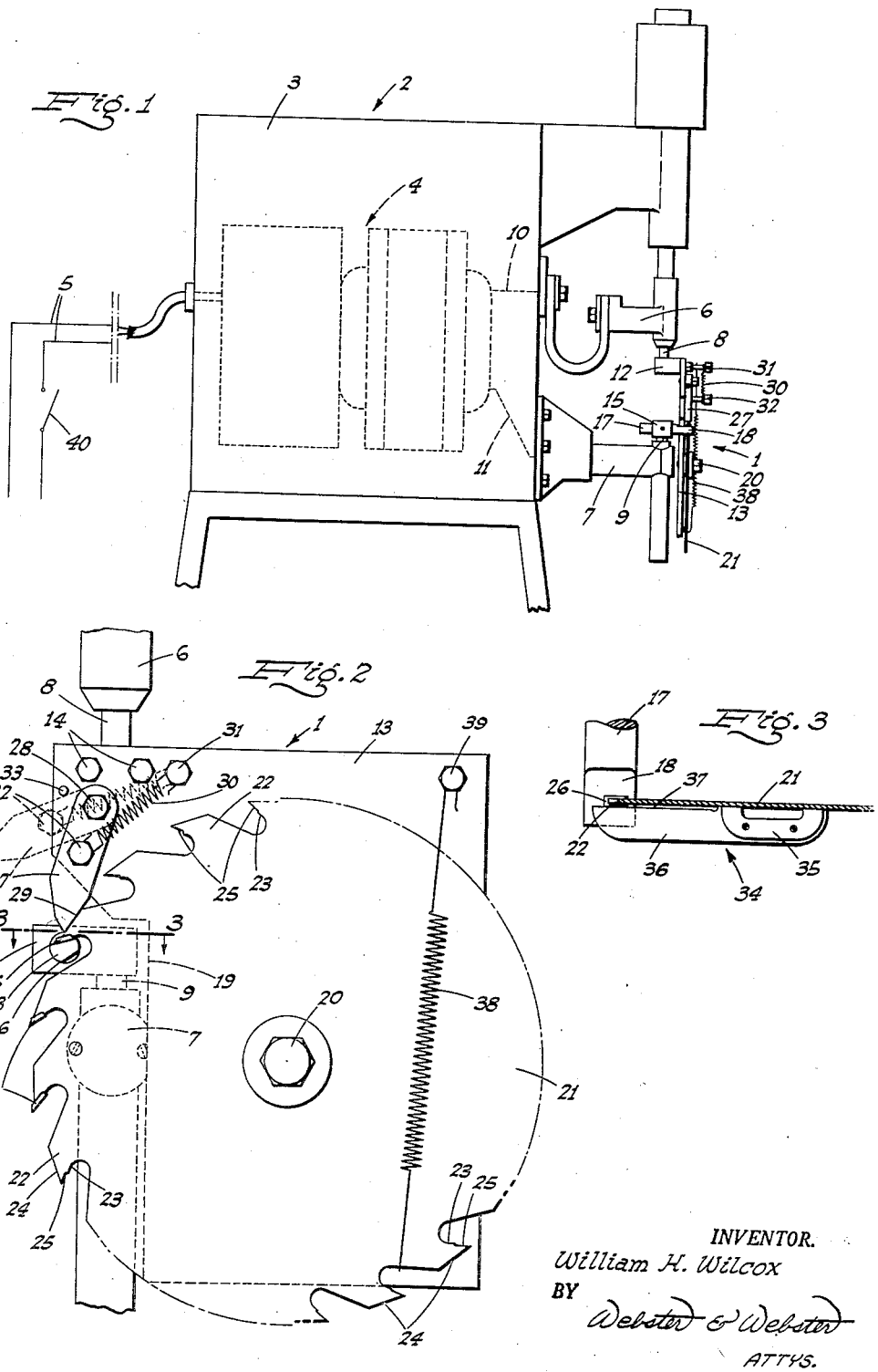
INVENTOR.
William H. Wilcox
BY
Webster & Webster
ATTYS.

United States Patent Office 2,823,295
Patented Feb. 11, 1958

2,823,295

METHOD OF, AND APPARATUS FOR, ATTACHING INSERTS TO CIRCULAR SAW TEETH

William H. Wilcox, Stockton, Calif., assignor to California Cedar Products Company, Stockton, Calif., a corporation of California Application January 11, 1957, Serial No. 633,559

11 Claims. (Cl. 219—78)

The present invention is directed to, and it is a major object to provide, an improved method, and apparatus to perform the same, for attaching initially separate inserts or tips to circular saw teeth for the purpose of reconditioning the saw.

Another important object of this invention is to provide a method and apparatus, as above, whereby the inserts are secured to the saw teeth by resistance brazing; the apparatus being arranged in a manner such that the body of the saw and the teeth thereon are not subject to a heat which would destroy the temper or cause other damage, such as warping or like distortion.

An additional object of the invention is to provide a method and apparatus by means of which inserts can be effectively secured to very thin circular saw blades.

A further object of the invention is to provide apparatus, for the intended purpose, which can be in the form of a relatively simple attachment for a conventional spot welding machine, although the invention is not so limited.

A still further object of the invention is to provide a novel gauge device for centering each insert on a tooth of the saw prior to the resistance brazing operation which secures said insert in place.

It is also an object of the invention to provide a method of attaching inserts to circular saw teeth, which can be practiced with ease and economy.

Still another object of the invention is to provide a practical and reliable method of, and apparatus for, attaching inserts to circular saw teeth, and which will be exceedingly effective for the purpose designed.

These objects are accomplished by means of such structure and relative arrangement of parts as will fully appear by a perusal of the following specification and claims.

In the drawings:

Fig. 1 is a generally diagrammatic side elevation of a spot welding machine fitted with the attachment by means of which the method is practiced.

Fig. 2 is an enlarged front elevation of the attachment showing the manner of its use to resistance braze an insert or tip on a tooth of a circular saw.

Fig. 3 is an enlarged fragmentary sectional plan taken on line 3—3 of Fig. 2; the view showing particularly the magnetically secured insert-positioning gauge device.

Referring now more particularly to the drawings, and to the characters of reference marked thereon, the apparatus for the practice of the method is here illustrated in the form of an attachment, indicated generally at 1, secured in connection with a spot welding machine, indicated generally at 2.

Such spot welding machine is of a type which includes—within a housing 3—a transformer and cycle timer assembly 4 to which electric current is supplied by a circuit 5.

At the front of the housing 3 the machine 2 includes a forwardly projecting upper arm 6 and a forwardly projecting lower arm 7; said arms carrying upper and lower electrode posts, indicated at 8 and 9, respectively.

The electrode posts 8 and 9, which are supported in dielectric relation to each other, are connected in the welding current output circuit of the transformer and cycle timer assembly 4 by leads, indicated at 10 and 11, respectively.

The attachment 1, which is mounted in connection with the above described conventional spot welding machine 2, comprises the following:

At its lower end the upper electrode post 8 is fitted with an upper attachment block 12 to which the upper edge portion of a vertical outwardly facing mounting plate 13 is rigidly attached, adjacent one corner, by means of bolts 14.

The upper end of the lower electrode post 9 is fitted with a lower attachment block 15 having a bore 16 through which the cylindrical shank 17 of a carbon anvil 18 extends; the shank 17 being secured in the block 15 with the anvil 18 disposed outwardly of said block and facing upwardly. The mounting plate 13 is cut away, as at 19, to provide adequate clearance of said plate from the carbon anvil 18.

At a generally central point the mounting plate 13 is fitted with an arbor bolt 20, by means of which a circular saw 21 is secured in face to face relation on said mounting plate 13; the individual teeth of such saw being indicated at 22. The arrangement and dimensioning of the parts is such that when the circular saw 21 is mounted on the plate 13 by the bolt 20, any one of the teeth 22 can be disposed with its outer end portion in adjacent and directly overlying relation to the upwardly facing anvil 18.

The leading edge 23 of each tooth 22 is formed, adjacent the outer or peripheral edge 24, with a recess or notch 25 for the reception, in matching seated relation, of an insert or tip 26 of metal, such as tungsten carbide.

The present invention pertains to the resistance brazing of the inserts or tips 26 in proper and effectively secured position on the saw teeth 22.

At the upper corner which is adjacent the attachment block 12, the mounting plate 13 is fitted—at the front—with a swingable contact arm 27 pivoted at its upper end by a bolt 28 to said plate; such contact arm being swingable in a radial plane common to the circular saw 21. Thus, when a tooth 22 is disposed in the above described position relative to the anvil 18, as in Fig. 2, a contact edge 29 of said arm 27 will come into bearing on the peripheral edge 24 of such tooth upon downward swinging of the contact arm 27 under the influence of a tension spring 30. The contact edge 29 is of a length so that when in engagement with the peripheral edge 24 of a tooth 22, said edge 29 terminates adjacent but short of the extreme outer end of said tooth.

The tension spring 30 is connected between an anchor bolt 31 on the plate 13 and another bolt 32 on the contact arm 27 intermediate the ends of the latter. While the tension spring 30 works to maintain the contact arm 27 in a down-swung position, and in engagement with one of the teeth 22 during an insert securing operation, said contact arm may be swung upwardly to an over-dead-center and out-of-the-way position against a stop 33.

The above described apparatus is employed to practice the method in the following manner:

The circular saw 21 is manipulated until one tooth 22 directly overlies the carbon anvil 18, and thereafter an insert or tip 26 is manually placed on such anvil 18 and matchingly engaged in the recess or notch 25; lateral centering of the insert 26 with respect to the tooth 22 being accomplished by a removable, insert positioning gauge device, indicated generally at 34. The device 34 comprises a permanent magnet 35 adapted to be applied to the circular saw 21 inwardly of its periphery; there being a gauge arm 36 which extends outwardly from the magnet 35 and alongside the insert 26 on anvil 18. The gauge arm 36 includes a position gauging edge 37 spaced from the circular saw 21 the exact distance necessary to laterally center the insert 26 relative to the tooth 22.

After the insert 26 is properly centered laterally, and matchingly engaged in the recess or notch 25, the saw 21—turned so that the tooth forcefully holds said insert 26 against the anvil 18—is maintained in such position by a tension spring 38 connected between a top anchor bolt 39 and one of the lower teeth of the saw, being detachably hooked to the latter.

Next, the contact arm 27 is swung downward from its out-of-the-way position, as shown in dotted lines in Fig. 2, to its operative position as shown in full lines in said figure; such contact arm 27 then being disposed with its contact edge 29 abutting the peripheral edge 24 of the tooth 22, but terminating short of the outer end and clear of the insert.

With all of the parts thus set, the spot welding machine is caused to operate through the medium of a switch, preferably of the foot type, interposed at an appropriate point in the circuit, and which switch is here illustrated diagrammatically at 40.

Upon the cycle-timed welding current being applied through the electrode posts 8 and 9, the extreme outer end of the tooth 22 and the carbon anvil supported insert 26 are caused to heat by resistance. Such insert—which is "tinned" with silver solder—then brazes to the tooth 22.

The contact arm 27, engaged with the tooth as described—and during the resistance brazing operation—serves the function of bypassing a portion of the current and absorbing some of the heat; all to the end that the body of the circular saw 21 and the tooth to which the insert is brazed are not overheated, and which would destroy the temper or cause distortion.

More specifically, it is possible—with the presently described method and apparatus—to resistance braze inserts of approximately .050 thickness to circular saw blades of .030 thickness, yet without drawing the temper or causing other damage. By actual tests, the use of the contact arm 27 will hold the temperature well below the critical point of approximately 1700 degrees F., and usually in the range of 1350 degrees F.

After each insert 26 has been resistance brazed to one of the teeth 22, and the parts permitted to cool, the contact arm 27 is swung to its out-of-the-way position, and the circular saw 21 is then manipulated to bring the next following tooth in proper position relative to the anvil 18 for the next insert attaching operation.

By means of the described method and apparatus, and the manner of manipulating the latter, inserts can be relatively rapidly and economically attached to circular saw teeth in a positive and reliable manner.

From the foregoing description it will be readily seen that there has been produced such a method and apparatus as will substantially fulfill the objects of the invention, as set forth herein.

While this specification sets forth in detail the present and preferred details of the method and apparatus, still in practice such deviations from such details may be resorted to as do not form a departure from the spirit of the invention, as defined by the appended claims.

Having thus described the invention, the following is claimed as new and useful, and upon which Letters Patent is desired:

1. Apparatus for resistance welding of an initially separate insert to the tooth of a saw, comprising with a pair of electrode elements mounted in spaced dielectric relation and adapted to be connected to a source of welding current, a conductive support mounted on one of the elements, means to secure the saw on the support in electrical connection and with the tooth in a predetermined position, a conductive anvil mounted on the other electrode element, said anvil being disposed to support the insert for engagement by the tooth when the latter is in said predetermined poistion, and a contact member mounted on the support adapted to engage the tooth adjacent but clear of the insert and to establish direct electrical connection between said support and tooth.

2. Apparatus, as in claim 1, in which the anvil is of carbon.

3. Apparatus, as in claim 1, in which said contact member is an arm pivoted on the support for swinging between one position clear of the tooth and another position in engagement therewith.

4. Apparatus, as in claim 3, including spring means connected to the arm in a manner to yieldably urge the same into tooth engagement.

5. Apparatus for resistance welding of an initially separate insert to the tooth of a saw, comprising, with a pair of electrode elements mounted in spaced dielectric relation and adapted to be connected to a source of welding current, a conductive support mounted on one of the electrode elements, means to secure the saw on the support in electrical connection and with the tooth in a predetermined position, a conductive anvil mounted on the other electrode element, said anvil being disposed to support the insert for engagement by the tooth when the latter is in said predetermined position, and a contact member mounted on the support adapted to engage the tooth adjacent but clear of the insert and to establish direct electrical connection between said support and tooth; the tooth having an exposed edge adjacent the insert, and said contact member engaging and extending along such edge.

6. Apparatus for resistance welding of an initially separate insert to the tooth of a saw, comprising with a pair of electrode elements mounted in spaced dielectric relation and adapted to be connected to a source of welding current, a conductive support mounted on one of the electrode elements, means to secure the saw on the support in electrical connection and with the tooth in a predetermined position, a conductive anvil mounted on the other electrode element, said anvil being disposed to support the insert for engagement by the tooth when the latter is in said predetermined position, the tooth having an edge extending from closely adjacent the insert, and a contact member mounted on the support adapted to engage and extend along such edge clear of the insert and to establish direct electrical connection between said support and tooth.

7. Apparatus for resistance welding of an initially separate insert to a selected tooth of a circular saw, comprising, with a pair of electrode elements mounted in spaced dielectric relation and adapted to be connected to a source of welding current, a conductive support mounted on one of the electrode elements, arbor means to secure the saw on the support in electrical connection and with the tooth in a predetermined position, a conductive anvil mounted on the other electrode element, said anvil facing upwardly and being disposed to support the insert for engagement from above by the tooth when the latter is in said predetermined position, and a contact member mounted on the support adapted to engage an edge of the tooth adjacent but clear of the insert and to establish direct electrical connection between said support and tooth.

8. Apparatus, as in claim 7, in which said tooth edge is at the periphery of the saw, and said contact member being a swing arm having an edge adapted to matchingly engage said tooth edge.

9. Apparatus for resistance welding of an initially separate insert to the tooth of a saw, comprising, with a pair of electrode elements mounted in vertically spaced dielectric relation, an outwardly facing conductive plate mounted on the upper electrode element and depending therefrom, the saw being circular, arbor means to secure the saw on the plate in electrical connection and with the tooth in predetermined position, a conductive anvil mounted on the lower electrode element and projecting outwardly in position to support the insert for engagement by the tooth when the latter is in said predetermined position, the tooth having a peripheral edge extending from closely adjacent the insert, and a contact member mounted on the plate adapted to engage and extend along such edge clear of the insert and to establish direct electrical connection between said plate and tooth.

10. Apparatus, as in claim 9, in which the anvil faces upwardly and said tooth engages the insert from above; and spring means applied to the saw tending to rotate the same in a direction urging said tooth in the direction of the anvil.

11. A method of resistance-welding an initially separate insert to the tooth of a saw comprising the step of disposing the insert and saw tooth in engagement with each other, interposing the insert and saw in a welding circuit to braze the insert to the tooth, and bypassing a portion of the welding current at the tooth through a relatively large-area conductor so as to withdraw a portion of the heat generated in the saw by such current.

References Cited in the file of this patent

UNITED STATES PATENTS

| | | |
|---|---|---|
| 2,174,801 | Meyer | Oct. 3, 1939 |
| 2,311,525 | Ebbs | Feb. 16, 1943 |
| 2,454,190 | Lurcott | Nov. 16, 1948 |
| 2,673,279 | Drake | Mar. 23, 1954 |